US012590447B2

(12) United States Patent　　　　　　(10) Patent No.: US 12,590,447 B2
Cole et al.　　　　　　　　　　　　　　(45) Date of Patent: Mar. 31, 2026

(54) DRAIN CLEANER WITH CABLE COUNTING

(71) Applicant: Emerson Professional Tools, LLC, Elyria, OH (US)

(72) Inventors: Alex Michael Cole, Columbia Station, OH (US); Jeffrey Szucs, Ashland, OH (US)

(73) Assignee: Emerson Professional Tools, LLC, Elyria, OH (US)

( * ) Notice: Subject to any disclaimer, the term of this patent is extended or adjusted under 35 U.S.C. 154(b) by 41 days.

(21) Appl. No.: 18/420,087

(22) Filed: Jan. 23, 2024

(65) Prior Publication Data

US 2025/0237047 A1　　Jul. 24, 2025

(51) Int. Cl.
　　*E03C 1/302*　　　　(2006.01)
　　*B08B 9/045*　　　　(2006.01)
　　*G01D 5/14*　　　　(2006.01)
(52) U.S. Cl.
　　CPC .............. *E03C 1/302* (2013.01); *B08B 9/045* (2013.01); *G01D 5/145* (2013.01); *B08B 2209/04* (2013.01)
(58) Field of Classification Search
　　None
　　See application file for complete search history.

(56) References Cited

U.S. PATENT DOCUMENTS

| | | | |
|---|---|---|---|
| 3,078,486 | A | 2/1963 | Casto et al. |
| 3,544,051 | A | 12/1970 | Norman |
| 3,585,076 | A | 6/1971 | Prange |

| | | | |
|---|---|---|---|
| 4,092,780 | A | 6/1978 | Trethewey et al. |
| 4,540,017 | A | 9/1985 | Prange |
| 4,546,519 | A | 10/1985 | Pembroke |
| 5,009,242 | A | 4/1991 | Prange |
| 6,016,609 | A | 1/2000 | Donovan et al. |
| 6,056,218 | A | 5/2000 | Nanbu |
| 6,269,547 | B1 | 8/2001 | Chuang |
| 7,889,980 | B2 | 2/2011 | Sooy |
| 8,046,862 | B2 | 11/2011 | Eisermann et al. |
| 8,176,593 | B2 | 5/2012 | Gress et al. |
| 8,413,347 | B2 | 4/2013 | Gress et al. |
| 8,970,211 | B1 | 3/2015 | Olsson et al. |
| 9,463,965 | B2 | 10/2016 | Heravi et al. |
| 10,233,629 | B2 | 3/2019 | Cole et al. |
| 10,317,246 | B2 | 6/2019 | Martin et al. |
| 10,434,547 | B2 | 10/2019 | Turner et al. |

(Continued)

FOREIGN PATENT DOCUMENTS

| | | |
|---|---|---|
| AU | 2014242385 A1 | 9/2015 |
| AU | 2014101555 A4 | 10/2015 |

(Continued)

OTHER PUBLICATIONS

International Search Report and Written Opinion in PCT/US2025/011627, mailed May 13, 2025, 11 pages.

*Primary Examiner* — Natasha N Campbell

(74) *Attorney, Agent, or Firm* — Armstrong Teasdale LLP

(57) ABSTRACT

A drain cleaner includes a housing and inner and outer drums disposed in the housing. The inner drum is rotatable relative to the housing. The inner drum and the outer drum form an annular drum channel for receiving a drain cleaning cable. The inner drum defines an inner drum chamber. A drain cleaning cable is disposed within the annular drum channel. The drain cleaner includes a ferrous pick-up plate. The pick-up plate rotates with the inner drum. A sensor detects rotation of the ferrous pick-up plate.

13 Claims, 11 Drawing Sheets

(56)         References Cited

U.S. PATENT DOCUMENTS

| | | | |
|---|---|---|---|
| 10,527,402 | B1 | 1/2020 | Olsson et al. |
| 10,768,017 | B2 | 9/2020 | Schmauder et al. |
| 11,110,495 | B2 | 9/2021 | Turner et al. |
| 11,248,982 | B2 | 2/2022 | Krohlow et al. |
| 11,603,654 | B2 | 3/2023 | Denissen |
| 11,623,254 | B2 | 4/2023 | Turner et al. |
| 11,745,975 | B2 | 9/2023 | Martin et al. |
| 11,846,528 | B2 | 12/2023 | Cole et al. |
| 2008/0148503 | A1 | 6/2008 | Babb et al. |
| 2020/0206550 | A1 | 7/2020 | Blackford et al. |
| 2021/0103709 | A1 | 4/2021 | Zielke et al. |
| 2021/0197239 | A1 | 7/2021 | Denissen |
| 2021/0310231 | A1 | 10/2021 | Kuhls et al. |
| 2022/0128424 | A1 | 4/2022 | Krohlow et al. |
| 2023/0028473 | A1 | 1/2023 | Watkins et al. |
| 2023/0173561 | A1 | 6/2023 | Grode et al. |
| 2023/0193615 | A1 | 6/2023 | Denissen |
| 2023/0201893 | A1 | 6/2023 | Turner et al. |

FOREIGN PATENT DOCUMENTS

| | | | |
|---|---|---|---|
| CA | 2722769 | A1 | 11/2009 |
| CA | 2904245 | A1 | 10/2014 |
| CA | 2686293 | C | 5/2015 |
| CN | 101631918 | A | 1/2010 |
| CN | 201661850 | U | 12/2010 |
| CN | 101782681 | B | 12/2013 |
| CN | 102036759 | B | 5/2014 |
| CN | 104534994 | A | 4/2015 |
| CN | 104776790 | A | 7/2015 |
| CN | 105102368 | B | 6/2018 |
| CN | 210129095 | U | 3/2020 |
| CN | 213240791 | U | 5/2021 |
| CN | 213843665 | U | 7/2021 |
| CN | 110016961 | B | 11/2021 |
| CN | 216586960 | U | 5/2022 |
| CN | 217543532 | U | 10/2022 |
| CN | 219196242 | U | 6/2023 |
| CN | 219798187 | U | 10/2023 |
| DE | 3565946 | | 12/1988 |
| DE | 112007003127 | T5 | 11/2009 |
| DE | 112014001342 | T5 | 12/2015 |
| DE | 102018220546 | B4 | 10/2022 |
| EP | 0159200 | B1 | 11/1988 |
| EP | 2189868 | B1 | 4/2013 |
| EP | 2587332 | B1 | 7/2014 |
| EP | 2587333 | B1 | 7/2014 |
| EP | 2313211 | B1 | 9/2015 |
| EP | 3555704 | A4 | 11/2020 |
| EP | 3814839 | A4 | 4/2022 |
| EP | 4133136 | A1 | 2/2023 |
| EP | 3969192 | A4 | 4/2023 |
| JP | S6133282 | A | 2/1986 |
| JP | 03481103 | B2 | 6/1999 |
| JP | H11155439 | A | 6/1999 |
| WO | 2008079702 | A3 | 11/2008 |
| WO | 2009143497 | A3 | 2/2010 |
| WO | 2014158305 | A1 | 10/2014 |
| WO | 2018112411 | A1 | 6/2018 |
| WO | 2019217676 | A1 | 11/2019 |
| WO | 2020231966 | A1 | 11/2020 |
| WO | 2021207354 | A1 | 10/2021 |

165

DRAIN CLEANER WITH CABLE COUNTING

FIELD

The field of the disclosure relates generally to drain cleaners and, more particularly, to drain cleaners having cable counting.

BACKGROUND

Drain cleaners include a drain cleaning cable that is expelled (i.e., payed out) from a housing of the drain cleaner. The expelled cable is positioned within a drain. The cable rotates as the cable is pushed through the drain by the operator. Rotation of the cable cleans debris from the drain and causes a cleaning tool at the end of the cable to ensnare a clog in the drain. The ensnared drain clog may be retracted from the drain.

It is desirable to determine the length of cable that is payed out from the drain cleaner to allow an operator to log repeated problem areas in the drain, to flag an area for inspection with a camera or to ensure that the drain cleaner is positioned in an area inspected and flagged by a camera. Conventional methods for cable counting involve markings on a cable sheath. Use of markings involves manual tracking and "zeroing" of distances by addition and subtraction. Other counting methods involve externally mounted sensors that may introduce debris into the drain cleaner.

A need exists for drain cleaners having cable counting systems that accurately and reliably determine the length of cable it payed out from the drain cleaner.

This section is intended to introduce the reader to various aspects of art that may be related to various aspects of the disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

SUMMARY

One aspect of the present disclosure is directed to a drain cleaner. The drain cleaner includes a housing, an outer drum disposed in the housing, and an inner drum disposed in the housing. The inner drum is rotatable relative to the housing. The inner drum and the outer drum form an annular drum channel for receiving a drain cleaning cable. The inner drum defines an inner drum chamber. A drain cleaning cable is disposed within the annular drum channel. A plurality of datum features rotate with the inner drum. The drain cleaner includes a sensor for detecting the passage of the datum features relative to the sensor. The drain cleaner includes a controller for determining a length of the drain cleaning cable payed out from the cable cleaner during cable cleaning operations based at least in part a number of datum features that have passed by the sensor.

Another aspect of the present disclosure is directed to a drain cleaner. The drain cleaner includes a housing, an outer drum disposed in the housing, and an inner drum disposed in the housing. The inner drum is rotatable relative to the housing. The inner drum and the outer drum form an annular drum channel for receiving a drain cleaning cable. The inner drum defines an inner drum chamber. A drain cleaning cable is disposed within the annular drum channel. The drain cleaner includes a ferrous pick-up plate. The pick-up plate rotates with the inner drum. The drain cleaner includes a sensor for detecting rotation of the ferrous pick-up plate.

Yet another aspect of the present disclosure is directed to a method for cleaning a drain. A drain cleaner is provided. The drain cleaner includes a housing and a drum disposed in the housing that rotates relative to the housing. The drain cleaner includes a drum channel for receiving a drain cleaning cable. The drain cleaner includes a pick-up plate. The pick-up plate has openings circumferentially spaced about the pick-up plate and has spans between openings in the pick-up plate. The pick-up plate rotates with the drum. A drain cleaning cable is expelled from the drum channel. The expelled drain cleaning cable is positioned in a drain. A length of drain cleaning cable payed out from the drum is determined by sensing the number of openings or spans that pass by a sensor.

Various refinements exist of the features noted in relation to the above-mentioned aspects of the present disclosure. Further features may also be incorporated in the above-mentioned aspects of the present disclosure as well. These refinements and additional features may exist individually or in any combination. For instance, various features discussed below in relation to any of the illustrated embodiments of the present disclosure may be incorporated into any of the above-described aspects of the present disclosure, alone or in any combination.

BRIEF DESCRIPTION OF THE DRAWINGS

Corresponding reference characters indicate corresponding parts throughout the drawings.

DETAILED DESCRIPTION

Figure 1:
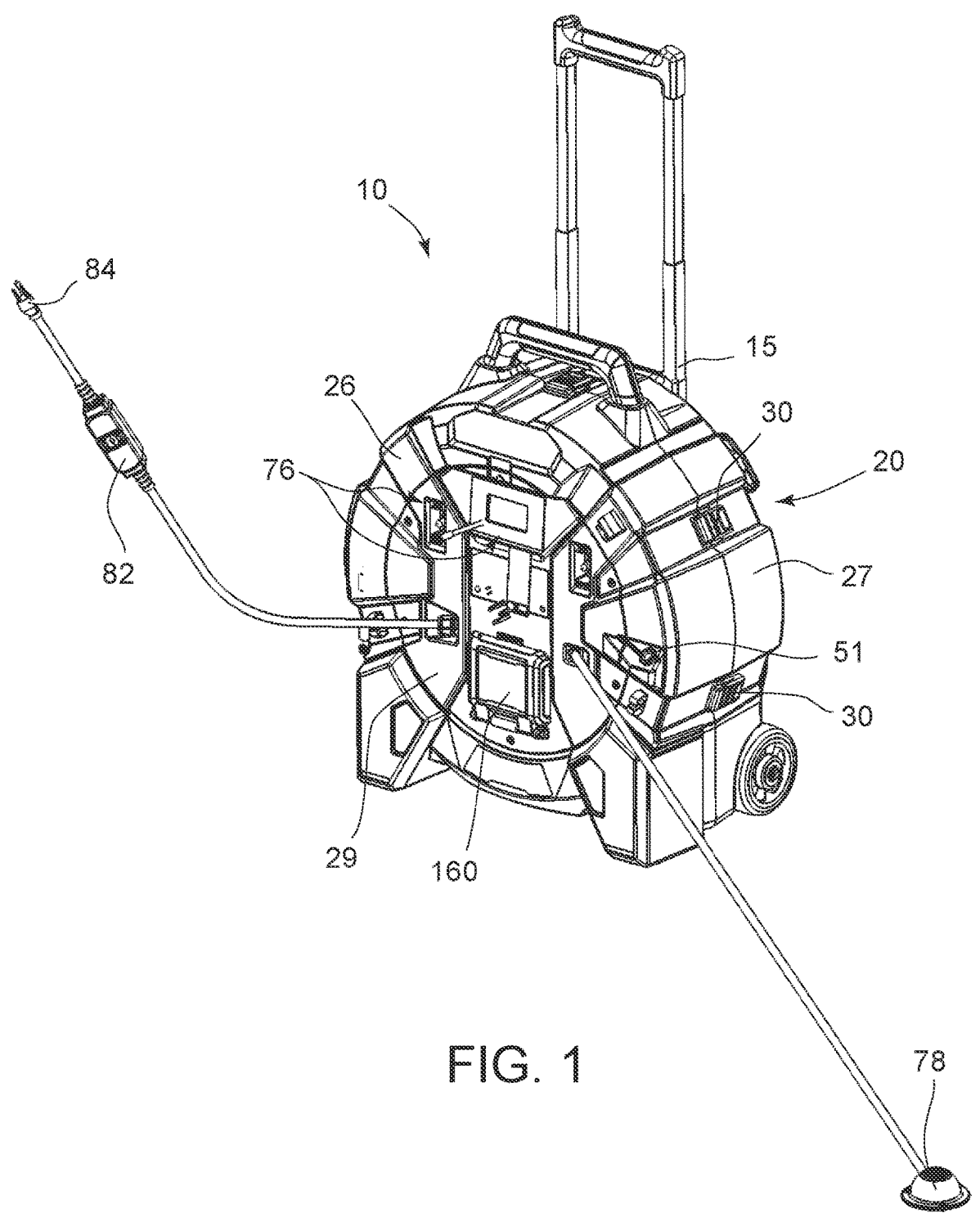
FIG. 1 is a perspective view of a drain cleaner.
Figure 2:
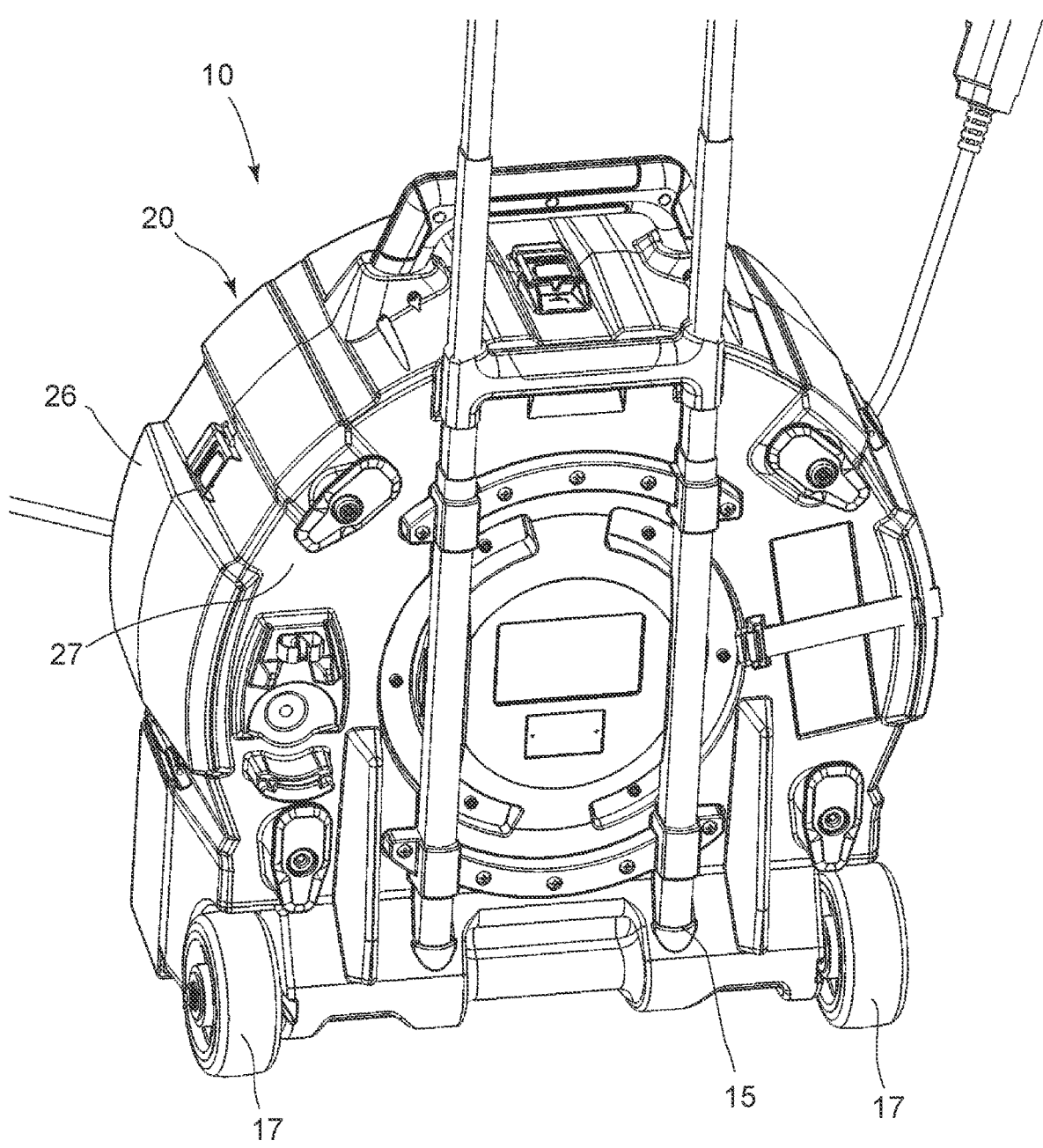
FIG. 2 is another perspective view of the drain cleaner.
Figure 3:
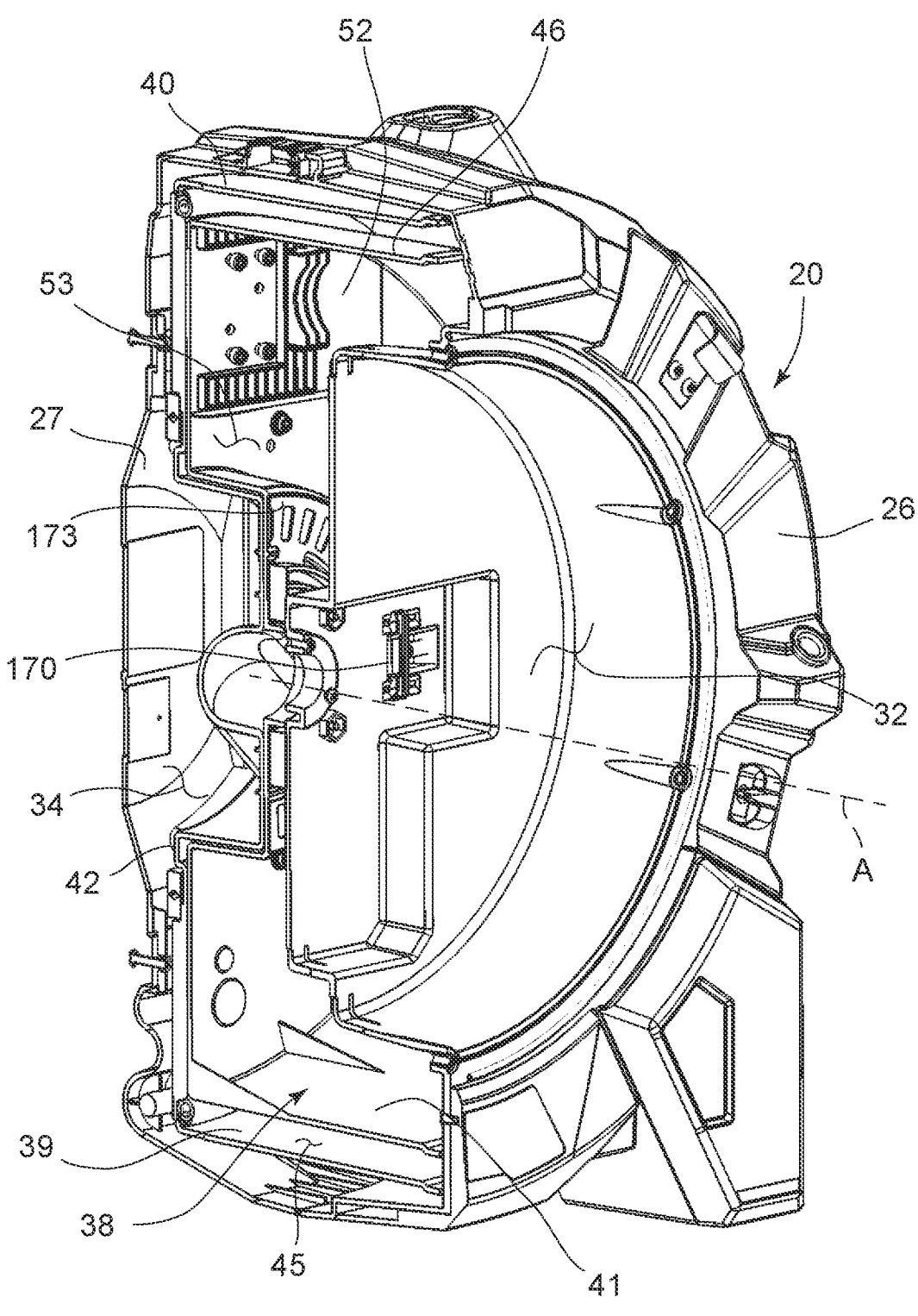
FIG. 3 is a cross-section of the drum and the drum housing of the drain cleaner.
Figure 4:
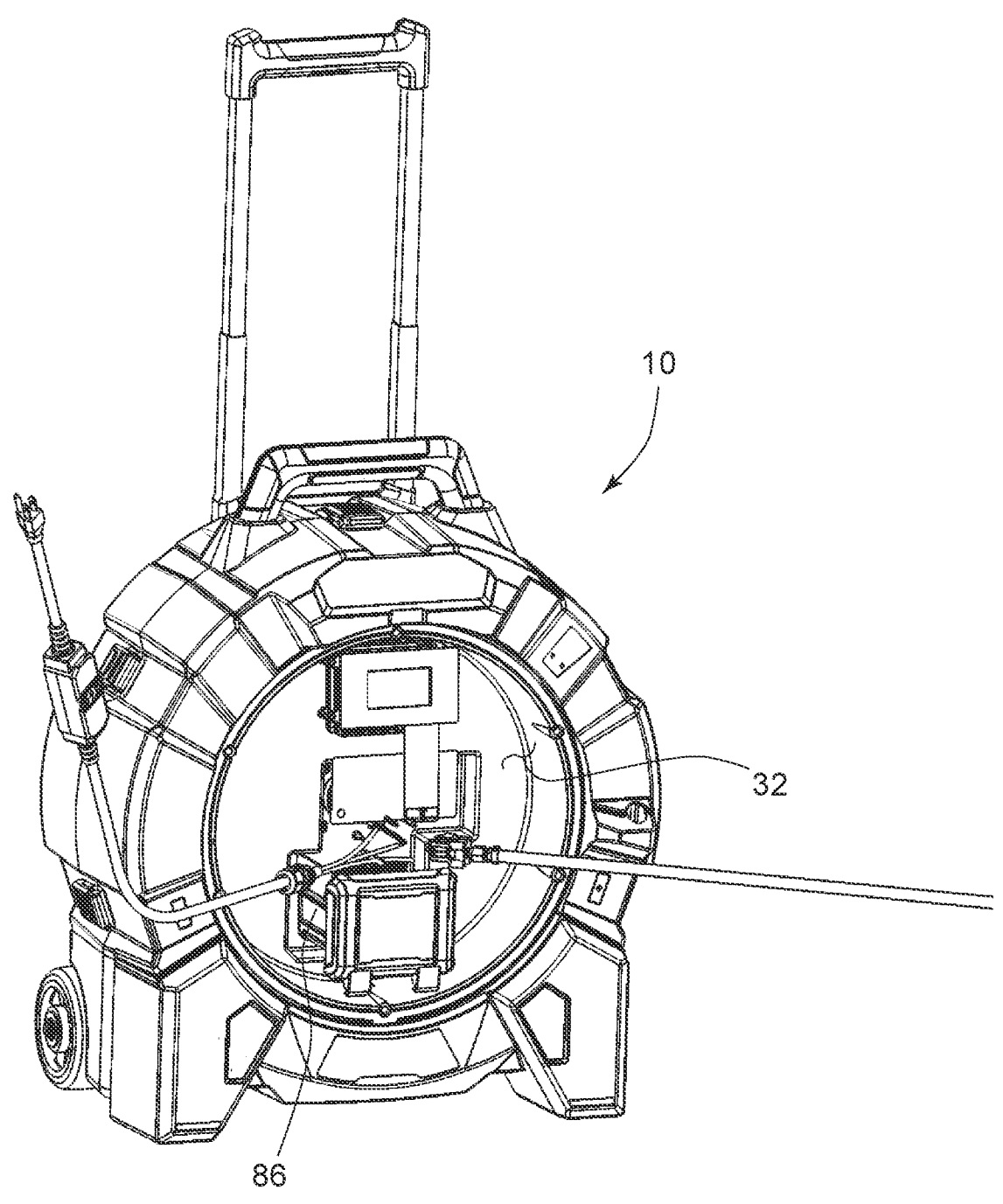
FIG. 4 is a perspective view of the drain cleaner showing the housing chamber in which electronic components are disposed.

An embodiment of a drain cleaner 10 is shown in FIGS. 1-11. The drain cleaner 10 is shown in a vertical orientation and includes an optional cart 15. The drain cleaner 10 is selectively attachable, detachable, and/or releasable from the cart 15. The drain cleaner 10 includes at least one wheel 17 (FIG. 2) and typically utilizes two, four or six wheels. The drain cleaner 10 is typically operated in a horizontal orientation (e.g., may include a bearing that accommodates axial loads when the drain cleaner 10 is operated in a horizontal orientation). The drain cleaner 10 may include features and components disclosed in U.S. Patent Publication No. 2021/0172162, which is incorporated herein by reference for all relevant and consistent purposes.

The drain cleaner 10 operates by rotating a cleaning head 63 (FIG. 6) as the cleaning head 63 moves through a drain. In the illustrated embodiment, the cleaning head 63 is connected to a drain cleaning cable 61 that includes a sheath 65 and a cable 68 positioned within the sheath 65. The cable 68 rotates relative to the sheath 65. The cable 68 connects to the cleaning head 63 at a distal end 70 of the cable 68. The cable 68 also connects to the output of a gear box 58 (FIG. 5) at a proximal end 72 of the cable 68. While the present disclosure describes a drain cleaning cable having a cable that rotates within a sheath, other types of drain cleaning cables could be used.

The drain cleaner 10 includes a drum housing 20 (FIG. 1). The drum housing 20 is generally cylindrical. The drum housing 20 includes a front housing segment 26 and a rear housing segment 27. The front housing segment 26 includes a front segment housing cover 29.

The cover 29 encloses a front segment housing chamber 32 (FIG. 3) in which a various electronic components (e.g., motor controller) are disposed. The front housing segment 26 and the rear housing segment 27 form a housing chamber 34 in which a rotatable drum 38 is disposed.

Figure 6:
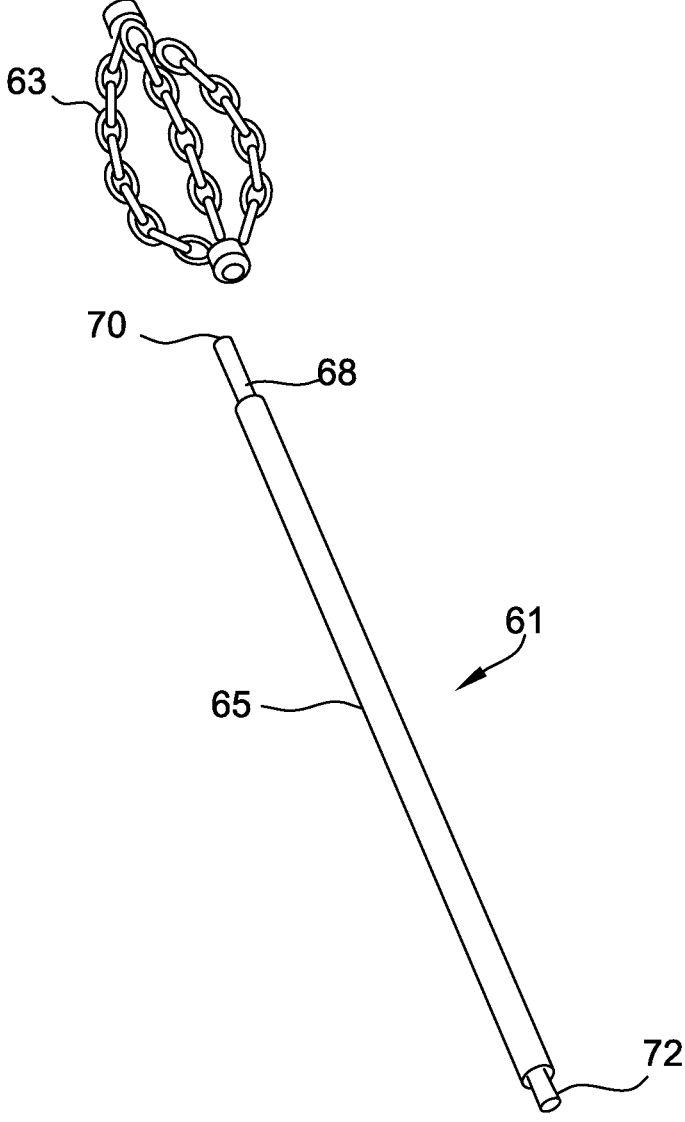
FIG. 6 is an exploded view of the drain cleaning cable and a cleaning head of the drain cleaner.

The rotatable drum 38 includes an outer drum 39 and an inner drum 41 disposed within the outer drum 39. The inner drum 41 and outer drum 39 are rotatable relative to the drum housing 20 and rotate about axis A. The outer drum 39 and inner drum 41 are both cylindrically shaped. The inner drum 41 is concentrically positioned within the outer drum 39. The outer drum 39 and the inner drum 41 form an annular drum channel 45 for receiving the drain cleaning cable 61 (FIG. 6). The drain cleaning cable 61 is disposed within annular drum channel 45 and moves in and out of the drum housing 20 (FIG. 1) as the inner drum 41 and outer drum 39 rotate. The drum housing 20 includes a cable port 51 through which the cable passes during cleaning operations of the drain cleaner 10.

The drain cleaner 10 may include drum support assemblies (not shown) that support the outer drum 39 and inner drum 41 and may include a bearing disposed between the primary and secondary support assemblies that enables the drum 38 to rotate relative to the housing 20.

The outer drum 39 includes an annular partition 40 and a basewall 42 that extends radially inward from the annular partition 40 toward the axis of rotation A of the inner drum 41. The inner drum 41 includes an annular partition 46 and a basewall 52 that extends radially inward from the annular partition 46 toward the axis of rotation A of the inner drum 41. The inner drum 41 defines an inner drum chamber 53 in which various components that rotate with the inner drum 41 are disposed.

Figure 5:
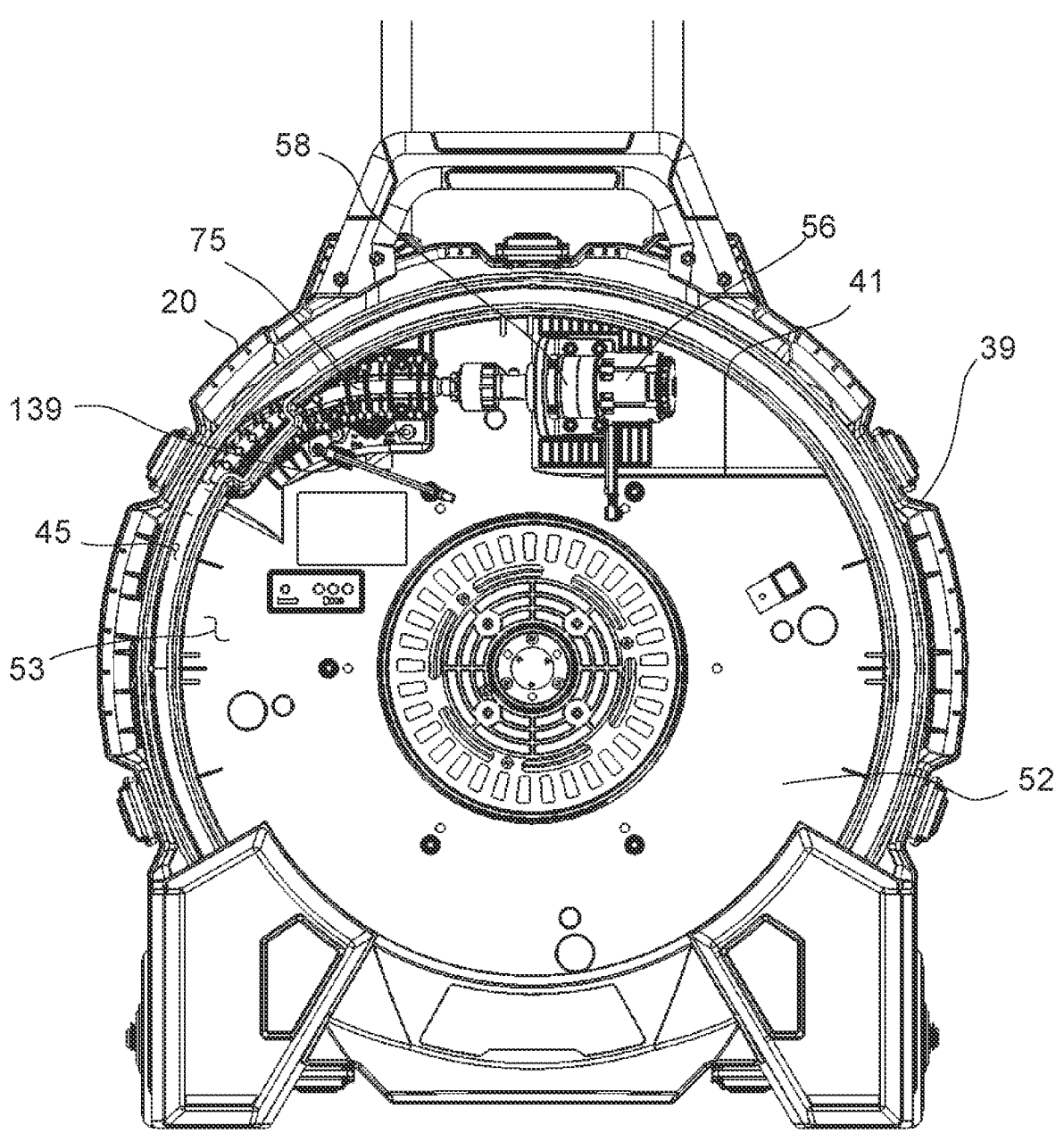
FIG. 5 is a front view of the drain cleaner showing the inner drum chamber.

Referring now to FIG. 5, the drain cleaner 10 includes an electric motor 56 secured to the inner drum 41 and disposed within the inner drum chamber 53. The motor 56 rotates with the inner drum 41. In some embodiments, the drain cleaner 10 includes a counterweight secured to the inner drum 41 and disposed within the inner drum chamber 53. The drain cleaner 10 includes a gear box 58 connected to the motor 56 (e.g., connected to a rotary output of the motor 56). The gear box 58 rotates with the inner drum 41.

The drain cleaner 10 includes a cable clamp 75 secured to the inner drum 41 and disposed within the inner drum chamber 53. The cable clamp 75 is positioned over at least a region or portion of the drain cleaning cable 61 (FIG. 6). The cable clamp 75 rotates with the inner drum 41.

The drain cleaner 10 includes various controls and/or indicators 76 (FIG. 1). Specifically, the controls and indicators 76 can include one or more selector switches and electrical circuit breakers. The drain cleaner 10 may also optionally include a foot operated switch 78 for governing operation of the drain cleaner 10. The drain cleaner 10 includes components and circuitry for signal and/or power delivery between the housing cover 29 and the motor 56. The drain cleaner 10 includes a power cord assembly 82 having a plug 84 to connect the drain cleaner to mains power. The power cord assembly 82 also includes one or more switches and ground fault circuit interrupter (GFCI). The drain cleaner 10 also includes a battery 86 (FIG. 4) that may also be used to power the motor 56 (FIG. 5). The motor 56 is selectively powered by mains power or by the battery.

Figure 7:
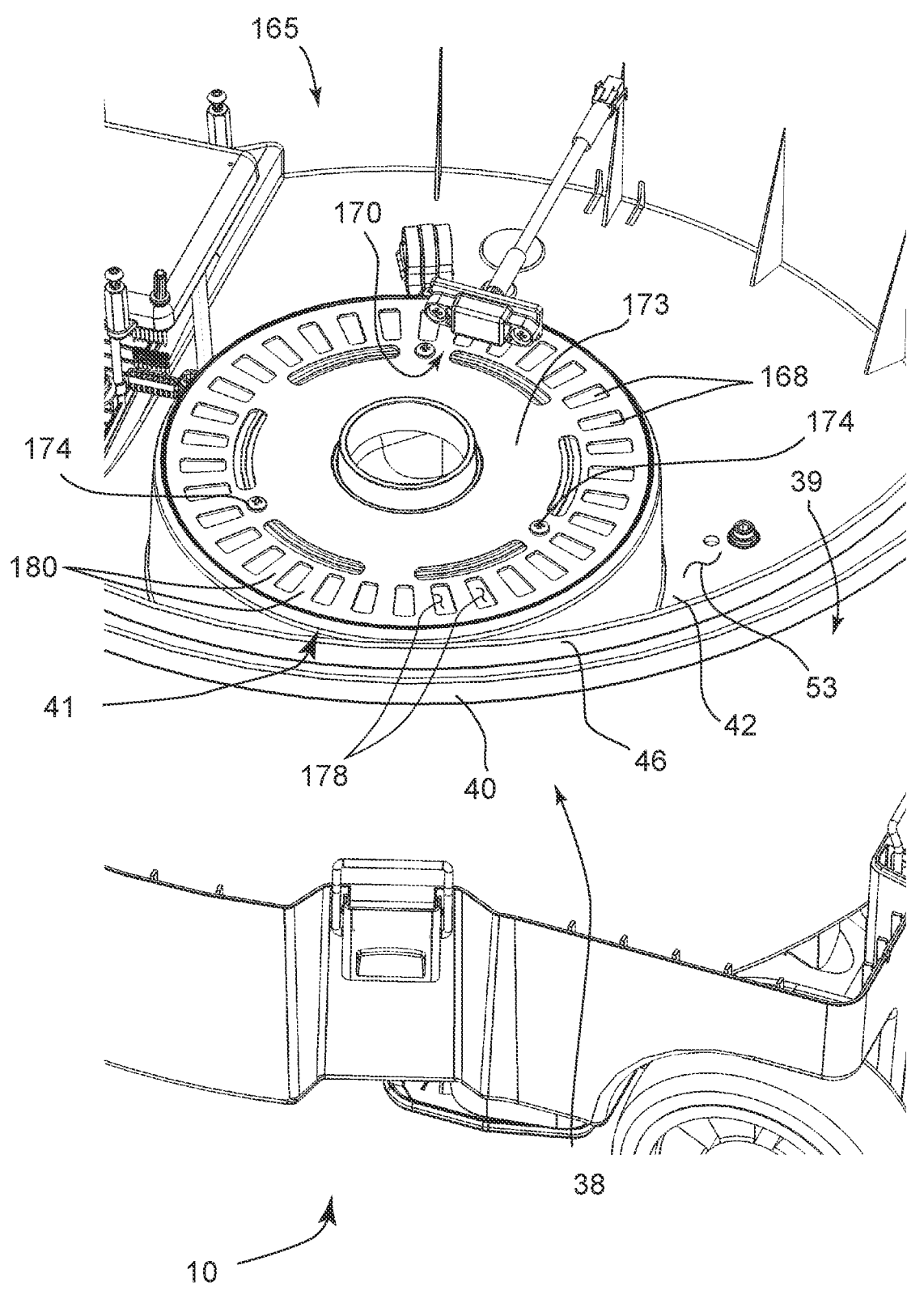
FIG. 7 is a detailed perspective view of the drain cleaner showing the pick-up plate.
Figure 8:
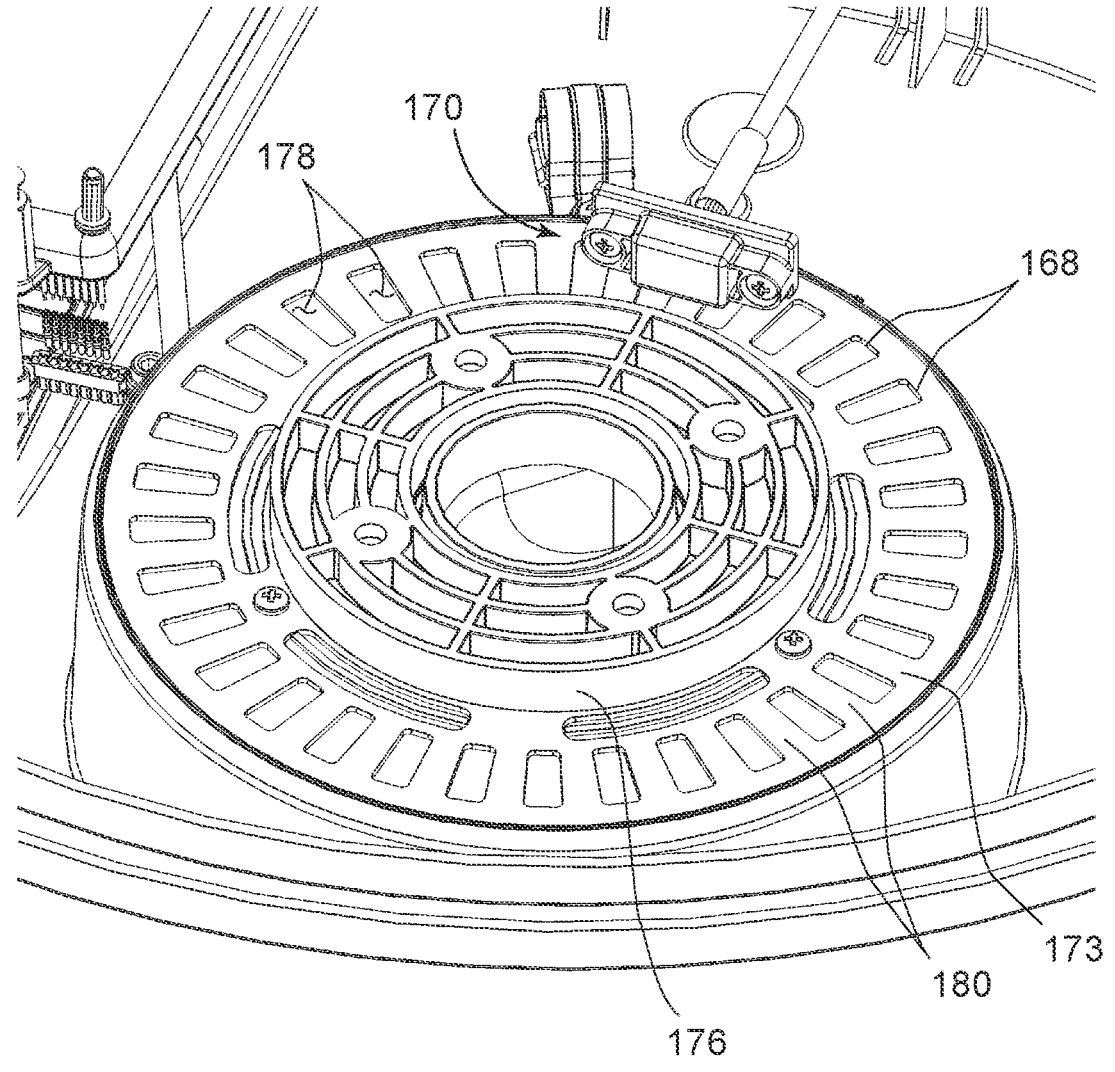
FIG. 8 is a detailed perspective view of the drain cleaner showing the pick-up plate and a bushing.

Referring now to FIG. 7, the drain cleaner 10 includes a cable counting system 165 for determining the length of the drain cleaning cable 61 (FIG. 6) that is payed out (i.e., expelled) from the drum 38 during drain cleaning operations. The system 165 includes a plurality of datum features 168 that rotate with the inner drum 41. A sensor 170 detects passage of the datum features 168 relative to the sensor 170 as the datum features 168 rotate as the cable 61 is expelled and retracted during drain cleaning operations.

In the illustrated embodiment, the datum features 168 are carried by a pick-up plate 173. The pick-up plate 173 is connected to the inner drum 41 by fasteners 174. The pick-up plate 173 is disposed between the inner drum 41 and the housing 20 (FIG. 2) and, in particular, between the inner drum 41 and a bushing 176 (FIG. 8) connected to the housing 20.

In the illustrated embodiments, the datum features 168 are openings 178 that circumferentially spaced about the pick-up plate 173. The openings 178 are separated by pick-up plate spans 180 that extend between adjacent openings 178. The sensor 170 senses the openings 178 or senses the spans 180 between openings 178. For example, the sensor 170 may sense when there is no ferrous metal below the sensor 170 as the pick-up plate rotates (in which case the sensor 170 senses the openings 178) or senses when ferrous metal is present below the sensor 170 as the pick-up plate 173 rotates (in which case the sensor 170 senses the spans 180). In other embodiments, the datum features 168 are spaced metal members (e.g., metal bars) carried by a pick-up plate (e.g., non-conductive plate) or spaced magnets.

In addition to sensing the openings 178 or spans 180, the sensor 170 may detect the direction the pick-up plate 173 (and drum 38) rotates (i.e., whether the cable is being expelled from or retracted into the drain cleaner). In some embodiments, the sensor 170 includes two or more sensing units within the sensor 170 (e.g., two sensing units within a common housing). The distance between the sensing units is less than the width of a datum feature 168 such that one of the sensing units senses a datum feature before a second sensing unit senses the datum feature which enables the direction of the datum units to be determined.

In some embodiments, the pick-up plate 173 is ferrous. The sensor 170 may be a magnetic sensor such as a hall effect sensor or more simply "hall sensor." An example hall sensor may include a magnet and two or more sensing units. The hall sensor transduces a sensed magnetic field to an electrical signal. The hall sensor may include power, ground and signal lines. Other magnetic sensors such as MR sensors may be used. In yet other embodiments, the sensor is an optical sensor.

Figure 9:
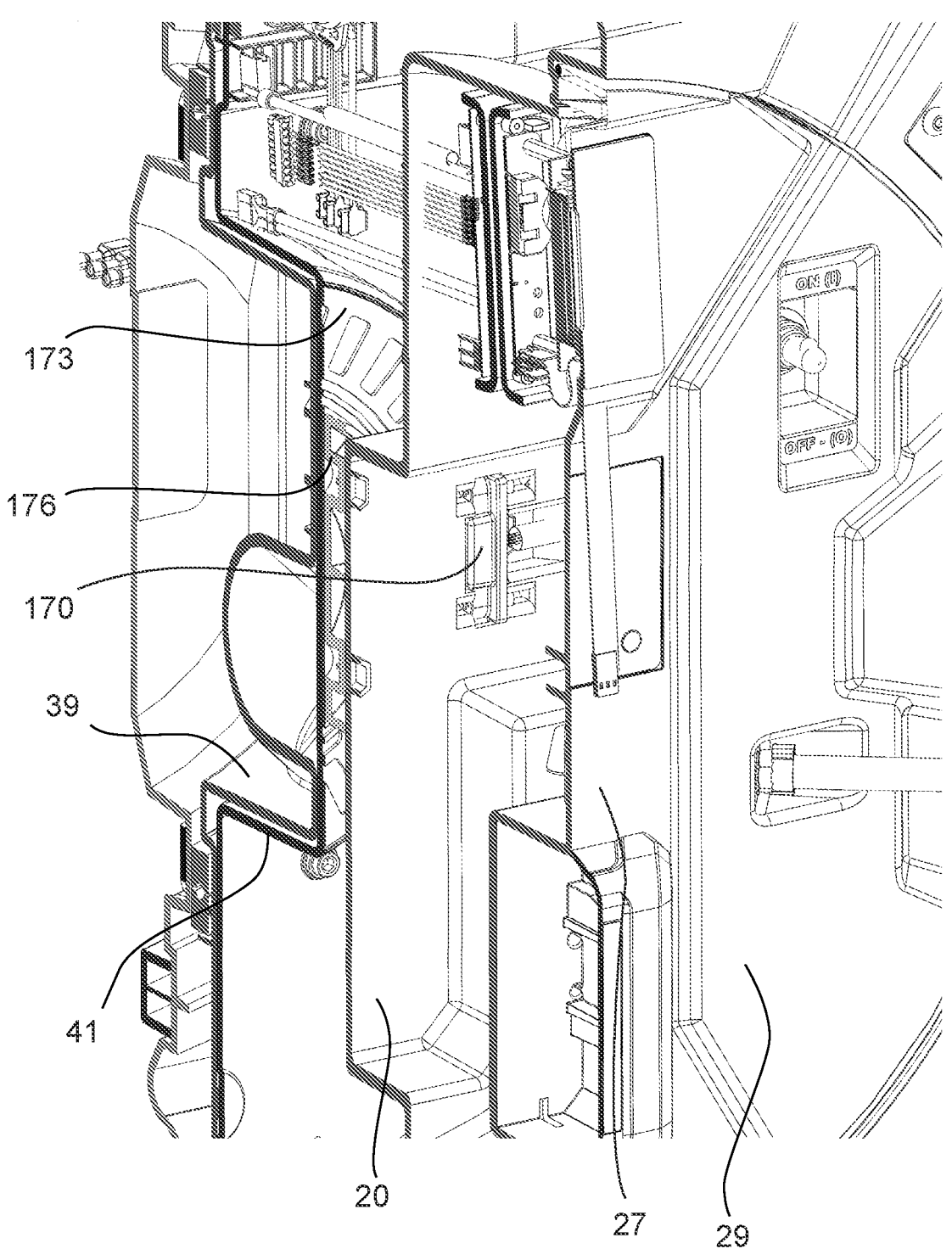
FIG. 9 is a detailed cross-section view of the drain cleaner showing a sensor.
Figure 10:
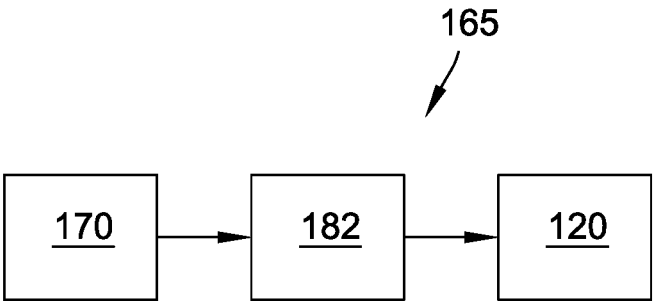
FIG. 10 is a block diagram of an embodiment of a cable counting system.

The sensor 170 is stationary and does not move with the drum 38. As shown in FIG. 9, the sensor 170 is connected to the housing 20 and, in particular, the front housing segment 27. In other embodiments, the sensor 170 rotates with the drum 138 and the datum features 168 remain stationary.

The cable counting system 165 may also include a controller 182 (FIG. 10) for determining the length of the expelled drain cleaning cable during drain cleaning operations. The controller 182 may be the same controller as the motor controller or may be a separate controller. The controller 182 may determine the length of the cable that is payed out based, at least in part, the number of datum features 168 that have passed by the sensor 170. For example, each datum feature 168 may correspond to a length of cable expelled from the drain cleaner housing 20 (FIG. 1) through port 51. The length of cable that is expelled during rotation of the drum 38 depends, in part, on the diameter of the cable would around the drum 38. The controller 182 may use the diameter of the inner drum 41 or the diameter of the outer drum 39 or some diameter between the diameter of the inner drum 41 and diameter of the outer drum 39 to determine the amount of cable that has been expelled. For example, the controller 182 may use the diameter of the half-way point between the inner drum 41 and outer drum 39 (i.e., the sum of the inner drum diameter and the outer drum diameter divided by 2). The controller 182 may determine the length of the cable that is expelled based on (1) the number of datum features that pass by the sensor 170, (2) the diameter of the drum and (3) the direction at which the datum features pass by the sensor (e.g., clockwise or counter-clockwise).

Once the length of payed out cable is determined by the controller 182, the controller 182 sends an output signal to indicators 76 (FIG. 1). For example, the controller 182 may send a signal to a user display which may be monitored by an operator during drain cleaning operations.

Figure 11:
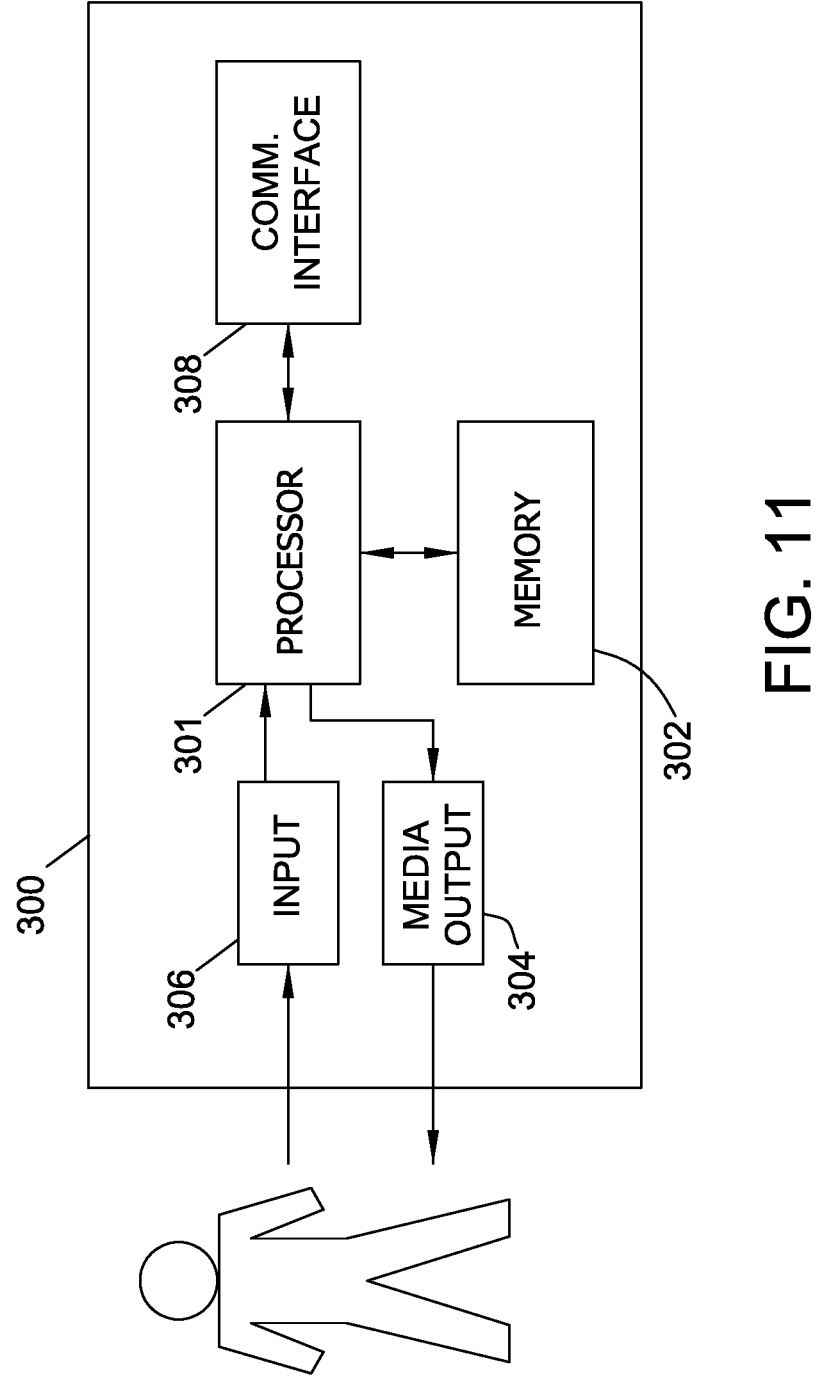
FIG. 11 is a block diagram of an example controller for use in the drain cleaner.

FIG. 11 is a block diagram of an example computing device 300 that may be used as, or included as part of, the controller 182 that determines the length of payed out drain cleaning cable 61 and as part of the drain cleaner 10. The computing device 300 includes a processor 301, a memory 302, a media output component 304, an input device 306, and a communications interface 308. Other embodiments include different components, additional components, and/ or do not include all components shown in FIG. 11.

The processor 301 is configured for executing instructions. In some embodiments, executable instructions are stored in the memory 302. The processor 301 may include one or more processing units (e.g., in a multi-core configuration). The term processor, as used herein, refers to central processing units, microprocessors, microcontrollers, reduced instruction set circuits (RISC), application specific integrated circuits (ASIC), a programmable logic circuit (PLC), and any other circuit or processor capable of executing the functions described herein. The above are examples only, and are thus not intended to limit in any way the definition and/or meaning of the term "processor."

The memory 302 stores non-transitory, computer-readable instructions for performance of the techniques described herein. Such instructions, when executed by the processor 301, cause the processor 301 to perform at least a portion of the methods described herein. That is, the instructions stored in the memory 302 configure the controller 182 to perform the methods described herein. In some embodiments, the memory 302 stores computer-readable instructions for providing a user interface to the user via media output component 304 and, receiving and processing input from input device 306. The memory 302 may include, but is not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). Although illustrated as separate from the processor 301, in some embodiments the memory 302 is combined with the processor 301, such as in a microcontroller or microprocessor, but may still be referred to separately. The above memory types are example only, and are thus not limiting as to the types of memory usable for storage of a computer program.

The media output component 304 is configured for presenting information to a user (e.g., an operator of the drain cleaner). The media output component 304 is any component capable of conveying information to the user. Example media outputs include an output adapter and output devices such as a display device (e.g., a liquid crystal display (LCD), light emitting diode (LED) display, organic light emitting diode (OLED) display, cathode ray tube (CRT), "electronic ink" display, one or more light emitting diodes (LEDs)) or an audio output device (e.g., a speaker or headphones).

The computing device 300 includes, or is connected to, the input device 306 for receiving input from the user. The input device 306 is any device that permits the computing device 300 to receive analog and/or digital commands, instructions, or other inputs from the user, including visual, audio, touch, button presses, stylus taps, etc. The input device 306 may include, for example, a variable resistor, an input dial, a keyboard/keypad, a pointing device, a mouse, a stylus, a touch sensitive panel (e.g., a touch pad or a touch screen), a gyroscope, an accelerometer, a position detector, an audio input device, or any combination thereof. A single component such as a touch screen may function as both an output device of the media output component 304 and the input device 306.

The communication interface 308 enables the computing device 300 to communicate with remote devices and systems, such as remote sensors, remote databases, remote computing devices, and the like, and may include more than one communication interface for interacting with more than one remote device or system. The communication interfaces may be wired or wireless communications interfaces that permit the computing device 300 to communicate with the remote devices and systems directly or via a network. Wireless communication interfaces may include a radio frequency (RF) transceiver, a Bluetooth® adapter, a Wi-Fi transceiver, a ZigBee® transceiver, a near field communication (NFC) transceiver, an infrared (IR) transceiver, and/or any other device and communication protocol for wireless communication. (Bluetooth is a registered trademark of Bluetooth Special Interest Group of Kirkland, Washington; ZigBee is a registered trademark of the ZigBee Alliance of San Ramon, California.) Wired communication interfaces may use any suitable wired communication protocol for direct communication including, without limitation, USB, RS232, I2C, SPI, analog, and proprietary I/O protocols. In some embodiments, the wired communication interfaces include a wired network adapter allowing the computing device 300 to be coupled to a network, such as the Internet, a local area network (LAN), a wide area network (WAN), a mesh network, and/or any other network to communicate with remote devices and systems via the network.

The computer systems discussed herein may include additional, less, or alternate functionality, including that discussed elsewhere herein. The computer systems discussed herein may include or be implemented via computer-executable instructions stored on non-transitory computer-readable media or medium.

The non-transitory memory 302 stores instructions that are executed by the processor 301 to configure the controller 182. In accordance with embodiments of the present disclosure, the controller 182 is configured to determine the length of drain cleaning cable based, at least in part, the number of datum features 168 that pass by the sensor 170 in accordance with the embodiments described above. In addition, the controller 182 may determine the length of the cable 61 based, at least in part, the direction at which the datum features 168 rotate and/or the diameter of the inner drum 41, outer drum 39, or a diameter between the diameter of the inner drum 41 and the diameter of the outer drum 39.

Compared to conventional drain cleaners, the drain cleaners of embodiments of the present disclosure have several advantages. Use of a cable counting based on datum features that rotate with the drum allow for more accurate cable counting. Because the cable is disposed in an annular chamber bound by the inner drum and the outer drum, deviation between the actual length of payed out cable and the calculated length of cable is limited. In embodiments in which a hall sensor is used, the sensor may detect datum features (e.g., pick-up plate openings or spans between openings) while also detecting the direction at which the datum features rotate. The counting system is enclosed (e.g., within the housing) which reduces or prevents debris from entering the drain cleaner. The enclosed counting system is also less susceptible to damage.

As used herein, the terms "about," "substantially," "essentially" and "approximately" when used in conjunction with ranges of dimensions, concentrations, temperatures or other physical or chemical properties or characteristics is meant to cover variations that may exist in the upper and/or lower limits of the ranges of the properties or characteristics, including, for example, variations resulting from rounding, measurement methodology or other statistical variation.

When introducing elements of the present disclosure or the embodiment(s) thereof, the articles "a", "an", "the" and "said" are intended to mean that there are one or more of the elements. The terms "comprising," "including," "containing" and "having" are intended to be inclusive and mean that there may be additional elements other than the listed elements. The use of terms indicating a particular orientation (e.g., "top", "bottom", "side", etc.) is for convenience of description and does not require any particular orientation of the item described.

As various changes could be made in the above constructions and methods without departing from the scope of the disclosure, it is intended that all matter contained in the above description and shown in the accompanying drawing[s] shall be interpreted as illustrative and not in a limiting sense.

What is claimed is:

1. A drain cleaner comprising:
a housing;
an outer drum disposed in the housing;
an inner drum disposed in the housing, the inner drum being rotatable relative to the housing, the inner drum and the outer drum forming an annular drum channel for receiving a drain cleaning cable, the inner drum defining an inner drum chamber;
a drain cleaning cable disposed within the annular drum channel;

8 a plurality of datum features that rotate with the inner drum, the plurality of datum features being disposed within the housing;
a sensor for detecting the passage of the datum features relative to the sensor; and
a controller for determining a length of the drain cleaning cable payed out from the drain cleaner during cable cleaning operations based at least in part on a number of datum features that have passed by the sensor.

2. The drain cleaner as set forth in claim 1 wherein the controller determines the length of the drain cleaning cable based on the diameter of the outer drum, the diameter of the inner drum or a diameter between the diameter of the outer drum and the diameter of the inner drum.

3. The drain cleaner as set forth in claim 1 comprising a pick-up plate that comprises the plurality of datum features, the pick-up plate rotating with the inner drum.

4. The drain cleaner as set forth in claim 3 wherein the pick-up plate is ferrous.

5. The drain cleaner as set forth in claim 3 wherein the datum features are openings in the pick-up plate or are spans between openings in the pick-up plate.

6. The drain cleaner as set forth in claim 1 comprising a motor secured to the inner drum for rotating the drain cleaning cable, the motor being rotatable with the inner drum.

7. The drain cleaner as set forth in claim 1 wherein the drain cleaning cable comprises a sheath and a cable positioned within the sheath, the cable being rotatable relative to the sheath.

8. The drain cleaner as set forth in claim 1 wherein the sensor is a hall sensor.

9. The drain cleaner as set forth in claim 1 wherein the outer drum and inner drum rotate together to pay out drain cleaning cable from the drain cleaner.

10. A method for cleaning a drain comprising:
providing a drain cleaner comprising:
a housing;
a drum disposed in the housing, the drum rotating relative to the housing;
a drum channel for receiving a drain cleaning cable; and
a pick-up plate comprising openings circumferentially spaced about the pick-up plate and spans between openings in the pick-up plate, the pick-up plate rotating with the drum, the pick-up plate being disposed within the housing;
expelling a drain cleaning cable from the drum channel;
positioning the expelled drain cleaning cable in a drain; and
determining a length of drain cleaning cable payed out from the drum by sensing the number of openings or spans that pass by a sensor.

11. The method as set forth in claim 10 wherein the pick-up plate is ferrous and the sensor is a magnetic sensor.

12. The method as set forth in claim 11 wherein the sensor is a hall sensor.

13. The method as set forth in claim 10 wherein drum comprises:
an outer drum disposed in the housing; and
an inner drum disposed in the housing, the inner drum and the outer drum forming the drum channel, wherein the outer drum and inner drum rotate together to pay out the drain cleaning cable from the drain cleaner.

* * * * *